United States Patent
Atmur

(10) Patent No.: US 6,727,673 B2
(45) Date of Patent: Apr. 27, 2004

(54) ENERGY BALANCED SYSTEM, CONTROLLER AND METHOD FOR MOVING A LOAD TO A SETPOINT

(75) Inventor: Robert J. Atmur, Whittier, CA (US)

(73) Assignee: The Boeing Company, Seattle, WA (US)

( * ) Notice: Subject to any disclaimer, the term of this patent is extended or adjusted under 35 U.S.C. 154(b) by 28 days.

(21) Appl. No.: 10/164,087

(22) Filed: Jun. 5, 2002

(65) Prior Publication Data

US 2003/0227274 A1 Dec. 11, 2003

(51) Int. Cl.$^7$ .................................................. G05B 6/02
(52) U.S. Cl. ......................................... 318/619; 318/470
(58) Field of Search ................................ 318/437, 466, 318/468, 470, 484, 560, 609, 610, 618, 619, 621, 626, 632

(56) References Cited

U.S. PATENT DOCUMENTS

| | | | | |
|---|---|---|---|---|
| 3,970,942 A | * | 7/1976 | Mayer | 327/40 |
| 4,061,953 A | * | 12/1977 | Matsumoto | 318/573 |
| 4,258,301 A | * | 3/1981 | Kawa | 318/594 |
| 4,341,986 A | * | 7/1982 | Browder | 318/618 |
| 4,742,465 A | * | 5/1988 | Eastman | 700/56 |
| 5,677,609 A | * | 10/1997 | Khan et al. | 318/561 |
| 5,917,295 A | | 6/1999 | Mongeau | |

OTHER PUBLICATIONS

Robert J. Atmur; *Rule–Based Balanced Energy Controller*; Proceedings of the American Control Conference; Jun. 1999; pp. 1673–1676; 0–7803–4990; AACC; San Diego, California.

M.S. Kennedy Corp.; *28 AMP, 500 Volt IGBT Plus Diode Smart Power 3–Phase Motor Drive Power Hybrid—4357*; 6 pages; available at <http://www.mskennedy.com>; Preliminary Rev. E Nov. 2001.

* cited by examiner

Primary Examiner—Bentsu Ro
(74) Attorney, Agent, or Firm—Alston & Bird LLP

(57) ABSTRACT

A system for moving a load toward a setpoint includes an actuator connected to the load and a controller capable of controlling the operation of the actuator. The actuator can generate an input energy that is transferred to the load to move the load toward the setpoint, and the controller can control the operation of the actuator to move the load. The controller is also capable of determining a command distance based upon the setpoint and a current position of the load. Based upon the command distance, then, the controller can determine a pulse duration based upon the command distance. The controller can then apply an input pulse to the actuator for the pulse duration such that the actuator generates the input energy. Advantageously, the input pulse is applied such that the input energy equals an amount of energy lost by the load in moving the load toward the setpoint.

25 Claims, 4 Drawing Sheets

ENERGY BALANCED SYSTEM, CONTROLLER AND METHOD FOR MOVING A LOAD TO A SETPOINT

FEDERALLY SPONSORED RESEARCH OR DEVELOPMENT

This invention was made with government support under Contract No. N00024-00-C-6103 awarded by the Department of the Navy. The government may have certain rights in this invention.

FIELD OF THE INVENTION

The present invention relates to systems and methods for moving a load toward a setpoint and, more particularly, relates to systems, controllers and methods for moving a load toward a setpoint in an energy balanced manner.

BACKGROUND OF THE INVENTION

In many continuous processes, feedback controllers are used to generate an output that causes some corrective effort to be applied to the processes. In this regard, a feedback controller is capable of driving a measurable process variable toward a desired value, sometimes referred to as the setpoint. Generally, the controller uses an actuator, such as a motor, to affect the process and a sensor to measure the results of the process. Typically, a feedback controller determines its output by observing the error between the setpoint and a measurement of the process variable. In this regard, errors can enter into the process in any one of a number of manners, such as by an operator intentionally changing the setpoint or by a process load changing the process variable accidentally.

One type of feedback controller, a proportional-integral-derivative (PID) controller, determines the current value of the error in the system, the integral of the error over a recent time interval, and the current derivative of the error. In this regard, a PID controller determines not only how much of a correction to apply, but for how long to apply the correction. Typically, in systems including a PID controller, if the current error is large or the error has been sustained for a lengthy period of time or the error is changing rapidly, the controller will attempt to make a large correction by generating a large output. In contrast, if the process variable has matched the setpoint for a lengthy period of time, the controller will not attempt to make a large correction.

Whereas PID controllers are adequate in controlling many processes, PID controllers have drawbacks in some systems. For example, in some systems the actuator acts upon a load that generates a relatively large amount of frictional forces that oppose the actuator acting upon the load. In this regard, to control the actuator to drive the load, a traditional PID controller, that may operate with a 2–3 Hz bandwidth, would be required to overcome the static torque in the load. Thus, the traditional PID controller would be required to integrate to a high output current value and then quickly reduce the output current value to generate a running actuator torque equal to approximately half the maximum actuator torque. Then, the traditional PID controller would be required to stop the load at the setpoint.

Because the bandwidth of such a closed-loop system is often too low to capture the dramatic changes in friction seen in the many systems, a traditional PID controller generally cannot start and stop the actuator at the desired location. Also, due to the fact that the minimum current required to drive the load equals approximately half the maximum the actuator can provide, a traditional PID controller generally controls such systems with less than a desirable efficiency. Such low efficiency, in turn, generally causes significant heating of the actuator and the additional power loss generally limits the operational life of the system.

SUMMARY OF THE INVENTION

In light of the foregoing background, various embodiments of the present invention provides an improved system, controller and method for moving a load toward a setpoint. The system, controller and method move the load in an energy balanced manner where the amount of energy transferred to the load to move the load toward the setpoint equals the amount of energy lost by the load due to a frictional torque generated by the load. As such, the system, controller and method can move the load to the setpoint with one or more input pulses of short duration, as opposed to requiring a continuous input to the actuator the entire time the actuator drives the load to the setpoint. Also, because the system, controller and method move the load with short input pulses, the total power loss in the actuator can be reduced a significant amount as compared to traditional controllers.

According to one embodiment, a system for moving a load toward a setpoint includes an actuator connected to the load and a controller capable of controlling the operation of the actuator. In this regard, the actuator is capable of generating input energy that is transferred to the load to thereby move the load toward the setpoint, and the controller is capable of controlling the operation of the actuator to move the load toward the setpoint. To control the actuator, the controller is capable of determining a command distance based upon the setpoint and a current position of the load. Based upon the command distance, then, the controller can determine a pulse duration. With the pulse duration, the controller is additionally capable of applying an input pulse to the actuator for the pulse duration such that the actuator generates the input energy. Advantageously, the input pulse is applied such that the input energy equals an amount of energy lost by the load in moving the load toward the setpoint.

The system can include a drive element electrically connected between the controller and the actuator. The drive element can then receive a control signal from the controller and thereafter transmit the input pulse to the actuator based upon the control signal. Additionally, the system can include a sensor connected to the actuator and/or the load to thereby measure a current position of the load after the controller applies the input pulse to the actuator. As such, the controller can repeatedly determine the command distance, determine the pulse duration and apply the input pulse, and the sensor can repeatedly measure the actual position, until the actual position differs from the setpoint by less than a predetermined threshold.

As stated, the controller can determine the pulse duration based upon the command distance. Also, the controller can determine the pulse duration based upon a controller gain. In this regard, the controller is capable of determining the pulse duration T according to the following:

$$T = K_c \times \sqrt{\theta_{cmd}},$$

where $K_c$ represents the controller gain and $\theta_{cmd}$ represents the command distance. In addition to determining the command distance, the controller can also determine the controller gain, such as based upon a moment of inertia of the load, a controller torque and a frictional torque. In other words, the controller can determine the controller gain $K_c$ according to the following:

$$K_c = \sqrt{\frac{2 \times I}{\tau_c \times \left(1 + \frac{\tau_c}{\tau_f}\right)}},$$

where I represents the moment of inertia of the load, $\tau_c$ represents the controller torque and $\tau_f$ represents the frictional torque.

According to an embodiment that includes the sensor, the sensor can measure the current position of the load after the controller applies the input pulse to the actuator. And as such, when the current position of the load differs from the setpoint by more than a predetermined threshold, the controller can adjust the controller gain based upon the current position of the load. For example, the controller is capable of decreasing the controller gain by a predetermined amount when the current position of the load is greater than the setpoint. Also, for example, the controller is capable of increasing the controller gain by a predetermined amount when the current position of the load after moving the load is less than the setpoint. A method of moving a load to a setpoint is also provided.

BRIEF DESCRIPTION OF THE DRAWINGS

Figure 1:
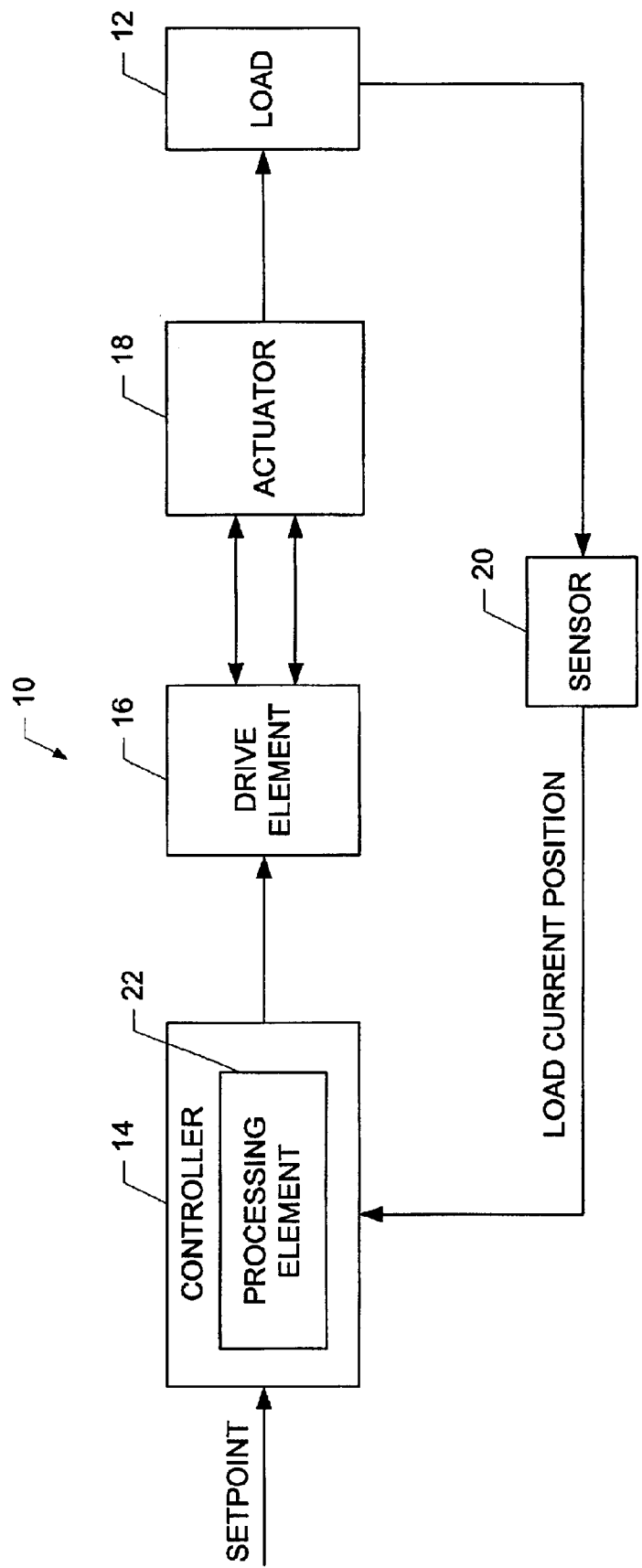
Figure 2:
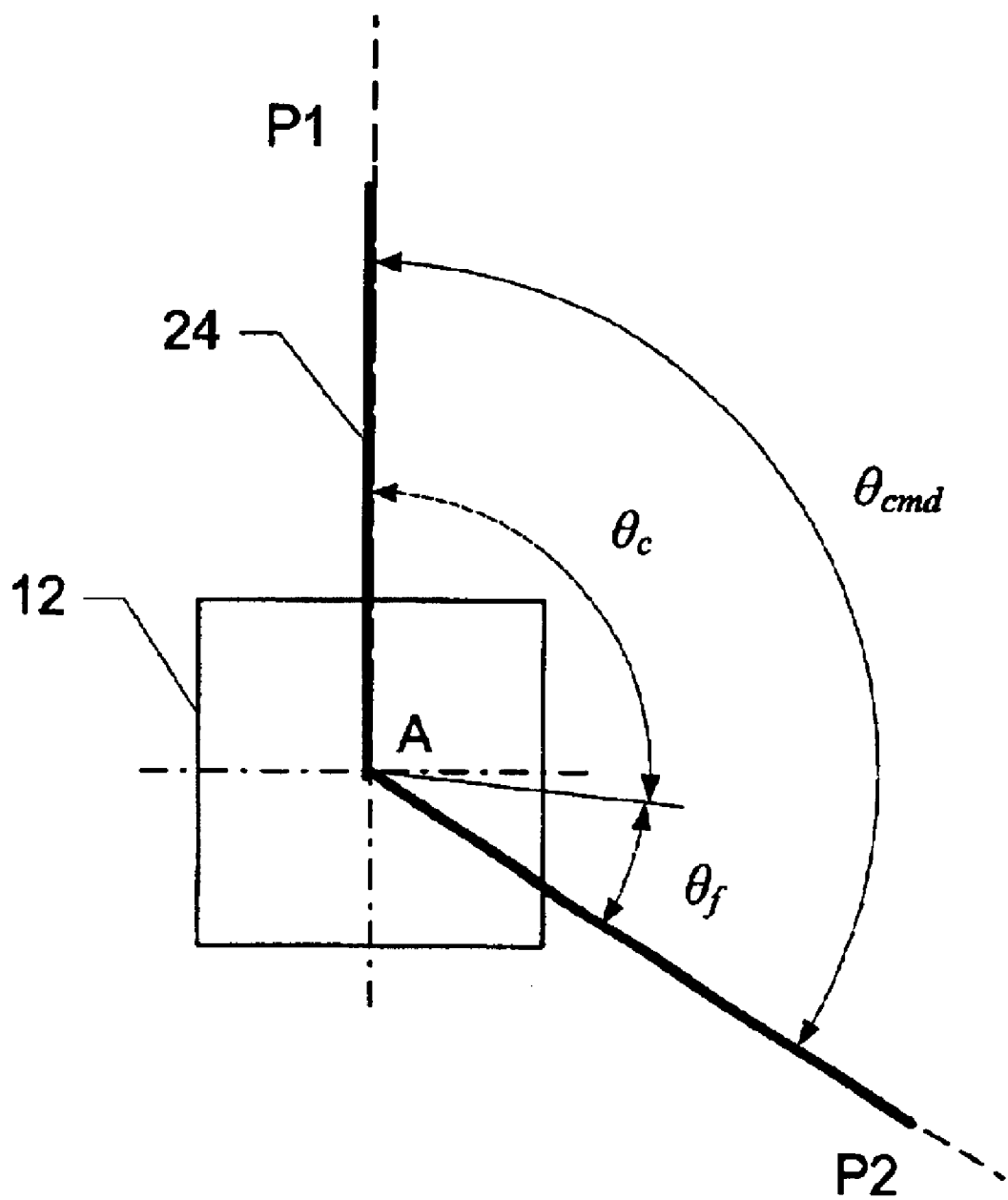
Figure 3:
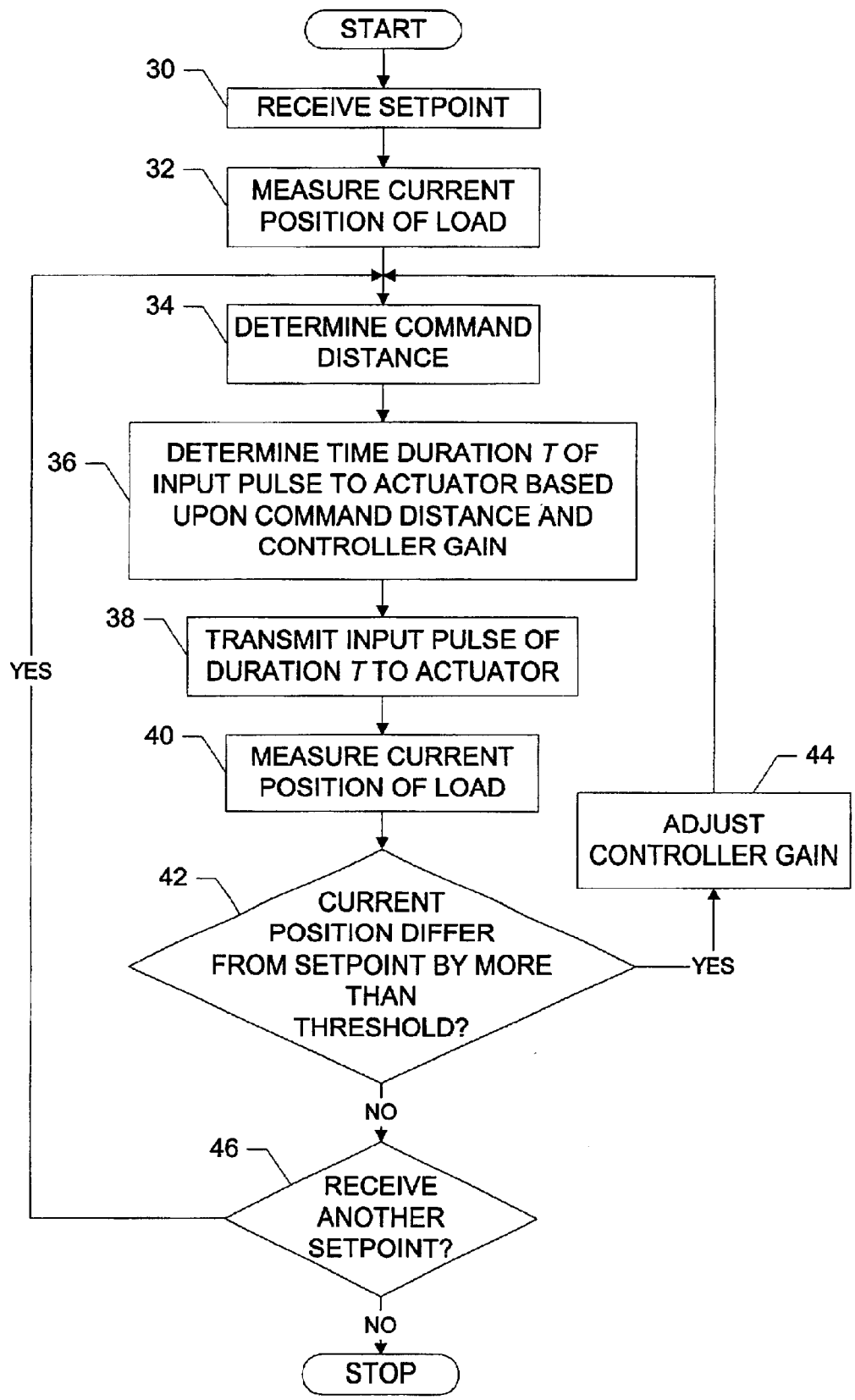
Figure 4:
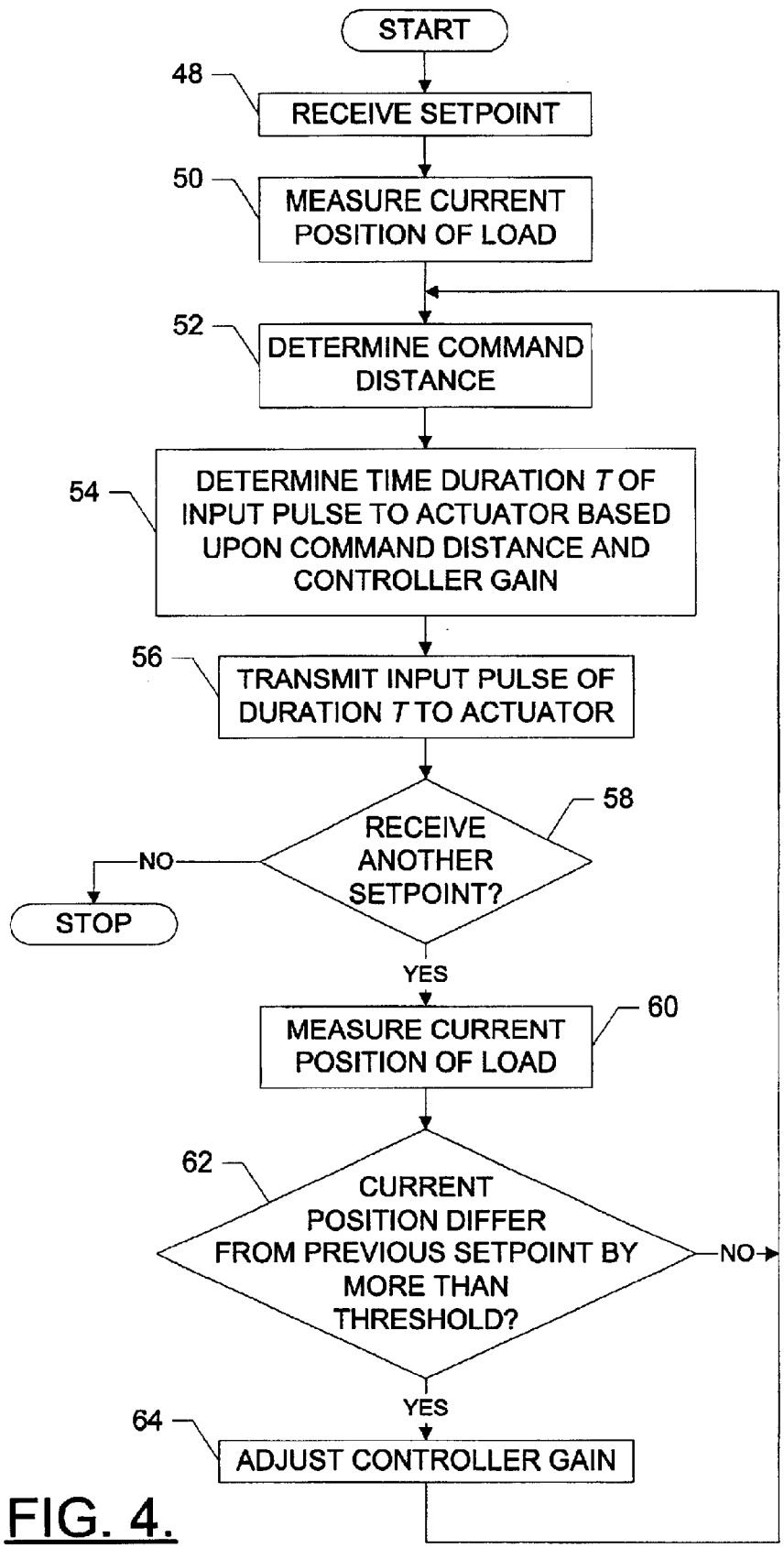

Having thus described the invention in general terms, reference will now be made to the accompanying drawings, which are not necessarily drawn to scale, and wherein:

FIG. 1 is a schematic block diagram of a system for moving a load to a setpoint according to one embodiment of the present invention;

FIG. 2 is a schematic illustration of the load where a portion of the load moves from a current position to the setpoint, according to one embodiment of the present invention;

FIG. 3 is a flow chart illustrating various steps in a method of moving a load to a setpoint according to one embodiment of the present invention; and FIG. 4 is a flow chart illustrating various steps in a method of moving a load to a setpoint according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, according to one aspect of the present invention, a system 10 is provided for controlling a load 12 to a setpoint, where the load generates a frictional torque $\tau_f$ that opposes movement of the load. According to one embodiment, the system includes a controller 14, a drive element 16, an actuator 18 and a sensor 20. And although not illustrated, the system generally also includes a power supply, as such is known. Whereas the system can be employed to perform any of a number of desired functions, in one embodiment the system is employed with an underwater vehicle to control the position of a fin (i.e., load), thereby steering the vehicle. And as the vehicle can include one or more fins to steer the vehicle, the system can include additional drive elements, actuators and sensors such that each fin can be separately controlled. Where the system includes more than one drive element, actuator and sensor, the system can include one controller for each fin, or the system can include a single controller for all of the fins.

The controller 14 comprises a processing element 22 that is capable of controlling the actuator to act upon the load. As such, the controller can drive the load 12 to move toward a desired setpoint, such as a desired angular position. Generally the processing element comprises a personal computer or other high level processor. It should be understood, however, that the processing element can comprise any of a number of different devices capable of performing the functions described herein. It should also be understood that, as described below, functions described as being performed by the controller can be performed by the processing element of the controller and vice versa.

The drive element 16 is electrically connected between the controller 14 and the actuator 18. The drive element is capable of receiving control signals from the controller and outputting an impulsed input voltage to the actuator based upon the control signals. In this regard, the drive element is generally electrically connected to the power supply. The drive element can comprise any of a number of different drive elements capable of providing a controllable input voltage to the actuator. In one embodiment, for example, the drive element comprises an H-bridge assembly including four switching elements. For example, the drive element can comprise an H-bridge assembly including for insulated-gate-bipolar transistors (IGBT's) arranged in two half-bridge assemblies, such as can be found in an MSK 4357 model 3-phase motor drive power hybrid manufactured by M.S. Kennedy Corp. of Liverpool, N.Y.

As the controller 14 is capable of controlling the actuator 18 to move the load 12 toward the setpoint, the actuator can also comprise any number of different known actuators capable of performing such a function. According to one preferred embodiment, for example, the actuator comprises a DC direct-drive angle-limited torque motor, such as a TMR-120-35-250-0 model direct-drive angle-limited torque motor manufactured by H2W Technologies of Valencia, Calif.

To provide proper control signals to the drive element 16 to drive the load 12 to move as close as possible toward the desired setpoint, the controller 14 typically receives feedback as to the actual position of the load, such as via the sensor 20. The sensor can directly measure the actual position of the load or, alternatively, the sensor can indirectly measure the position of the load based upon a position of the actuator 18, such as rotor magnetic field orientation of the actuator when the actuator comprises a motor. The sensor can comprise any of a number of known devices but, according to one embodiment, the sensor comprises a resolver, such as a 07S15RXM4/0452a15F18 model resolver manufactured by KOLLMORGEN/ARTUS of Northampton, Mass. At this point it should be understood that if the sensor measures the position of the load or actuator according to a format incompatible with the controller, the system can also include a converter (not shown), such as a resolver to digital converter, capable of converting the format of the sensor to a format compatible with the controller. In this regard, the converter can be integrated within the controller or sensor, or the converter can comprise a separate device, as such is known.

The actuator 18 is capable of generating mechanical energy. And as illustrated in FIG. 1, the actuator is connected to the load 12. Therefore, the actuator is capable of transferring the generated mechanical energy to the load to thereby move the load. In contrast to the mechanical energy transferred to move the load, the load generates an amount of frictional torque $\tau_f$ which, when mechanical energy is applied to the load, opposes movement of the load and results in a loss of energy in the load. Thus, to control the position of the load to thereby drive the load to the setpoint, the controller 14 is capable of controlling the actuator to transfer an amount of mechanical energy to the load to move the load toward the setpoint, where the amount of energy transferred to the load equals the amount of energy lost by the load in moving the load to the setpoint. In this regard, by only transferring to the load an amount of energy required to move the load to the setpoint and equating that energy to the amount of energy lost, the energy transferred to the load is sufficient to overcome the frictional torque generated by the load only to the extent necessary to move the load to the setpoint.

To control the actuator 18 and, thus, the movement of the load 12, the controller 14 transmits pulsed control signals to the drive element 16, and the drive element 16, in turn, drives the actuator for the duration of the pulsed control signals to generate the desired amount of energy to transfer to the load. Thus, as described below, the controller controls the movement of the load based upon the duration of the pulsed control signals. To understand how the controller determines the pulse duration, first consider that to generate an amount of energy required to overcome the frictional torque to move the load any distance, the actuator must generate a torque $\tau_a$ greater than the frictional torque $\tau_f$ generated by the load. In this regard, a net torque generated by the load being acted upon by the actuator, called the controller torque $\tau_c$, can be considered to equal the difference between the actuator torque and the frictional torque. In other words, the controller torque can be determined according to the following equation (1):

$$\tau_c = \tau_a - \tau_f \qquad (1)$$

Then, referring to FIG. 2, consider that to move the load 12 from a current position (designated P1) to the setpoint (designated P2), the load must move a command distance $\theta_{cmd}$ (an angular distance in the illustrated embodiment) equal to the distance between P1 and P2. Because the distance between P1 and P2 represents an offset of the load position from the desired setpoint, the command distance $\theta_{cmd}$ is sometimes referred to as the error distance. Consider also that the load loses energy throughout the entire movement of the load from P1 to P2. Because the actuator torque is greater than the frictional torque, the actuator 18 only needs to transfer energy to the load over a portion of the distance from P1 to P2, referred to as the controller distance $\theta_c$, so that the energy transferred to the load from the actuator equals the energy lost due to the frictional torque. In this regard, both the actuator torque and the frictional torque are creating an energy gain and loss, respectively, in the load over the controller distance $\theta_c$. And as the actuator does not transfer energy to the load over the remaining distance between P1 and P2, referred to as the frictional distance $\theta_f$, only the frictional torque acts on the load to generate an energy loss, which causes the load to slow down to a stop, preferably at P2. At this point it should be understood that, whereas the load illustrated includes a member 24, such as a fin, that moves angularly about an axis (designated A), however, it should be understood that the member and/or the entire load can move linearly or in other manners without departing from the spirit and scope of the present invention.

As illustrated in FIG. 2, to transfer energy to the load 12 sufficient to move the load from P1 to the setpoint P2, the energy generated by the actuator 18 and transferred to the load over the controller distance equals the energy lost by the load over the command distance. Mathematically, the relationship between the energy transferred to the load and the energy lost by the load, can be represented as follows:

$$\tau_a \times \theta_c = \tau_f \times (\theta_c + \theta_f) \qquad (2)$$

From equations (1) and (2), then, the energy transferred to the load 12 to move the load from P1 to P2 can be equated to the energy lost by the load over the same distance, and can be represented as follows:

$$\tau_c \times \theta_c = \tau_f \times \theta_f \qquad (3)$$

From equation (3), it can be shown that the frictional distance equals:

$$\theta_f = \frac{\tau_c}{\tau_f} \times \theta_c \qquad (4)$$

Also, presuming that the load begins moving with zero angular velocity, it can be shown that the controller distance can be represented as a function of the controller torque $\tau_c$, the time T required to move the load the controller distance and the moment of inertia I of the load. In this regard, the controller distance can be represented as follows:

$$\theta_c = \frac{1}{2} \times \frac{\tau_c}{I} \times T^2 \qquad (5)$$

Next, consider the effective distance the load 12 must move to reach the setpoint, referred to as the command distance $\theta_{cmd}$. As shown, the command distance equals the controller distance $\theta_c$ plus the frictional distance $\theta_f$, which must be taken into account due to the fact the load must overcome the frictional torque to move from the current position to the setpoint. In other words, the command distance can be represented as follows:

$$\theta_{cmd} = \theta_c + \theta_f \qquad (6)$$

From equations (3), (4) and (5), then, the duration of the pulse required to drive the actuator 18 to generate sufficient energy that is transferred to the load 12 to thereby move the load to the setpoint can be determined such that the energy generated equals the energy lost by the load in moving to the setpoint. In this regard, the duration of the pulse equals the time required to transfer energy to the load to thereby move the load the controller distance. Thus, the duration T can be determined as follows:

$$T = \sqrt{\frac{2 \times I \times \theta_{cmd}}{\tau_c \times \left(1 + \frac{\tau_c}{\tau_f}\right)}} \qquad (7)$$

Stated in another manner, the duration of the pulse can be represented as the product of the square root of the command distance and a controller gain $K_c$ as follows:

$$T = K_c \times \sqrt{\theta_{cmd}}, \qquad (8)$$

where the controller gain is represented according to the following:

$$K_c = \sqrt{\frac{2 \times I}{\tau_c \times \left(1 + \frac{\tau_c}{\tau_f}\right)}} \qquad (9)$$

With the controller gain $K_c$ and the command distance, then, the controller 14 can determine the duration of the pulsed control signals to thereby move the load.

Referring to FIG. 3, in operation according to one embodiment, to move the load 12 to a setpoint, the controller 14 first receives a setpoint, as shown in block 30. The setpoint can be received in any one of a number of manners such as, for example, via a user interface (not shown) as such are known. As illustrated in block 32, the sensor 20 then measures the current position of the load, as described above, and transmits the current position to the controller. It will be appreciated that, although the sensor is described as measuring the position of the load after the controller receives the setpoint, the sensor can measure the current position and/or transmit the current position to the controller before the controller receives the setpoint.

After the controller 14 has received both the setpoint and the current position of the load, the controller can determine the command distance $\theta_{cmd}$ by subtracting the setpoint from the current position, as shown in block 34. From equation (8), then, the controller can determine the time duration of the control signal to be applied to the drive element 16 which, in turn, equals the time duration of the input pulse to the actuator 18, as illustrated in block 36. As shown in equation (8), the square root of the command distance is multiplied by the controller gain $K_c$. In this regard, either as the controller determines the time duration, or before the controller determines the time duration, the controller must determine the controller gain $K_c$, such as according to equation (9). The controller gain is originally determined from known system parameters, including the moment of inertia I of the load, and the actuator torque $\tau_a$ and frictional torque $\tau_f$.

For example, consider a system including the following parameters: I=0.047 in.lb.sec$^2$, $\tau_a$=13 lb.in, $\tau_f$=5 lb.in. From equations (1) and (9), the controller gain can be determined as $K_c$=0.67225 sec. Also, for example, consider a command distance having been determined as $\theta_{cmd}$ rad. The time duration can then be determined according to equation (8) as T=21.25 msec.

After the time duration has been determined, the controller 14 transmits a control signal to the drive element 16 for the determined time duration. The drive element, in turn, transmits the input pulse to the actuator 18 for the time duration, as shown in block 38. From the input pulse, the actuator generates the desired amount of energy and transfers the energy to the load 12, which receives the energy and moves to the setpoint. At this point it will be understood that due to changing system parameters (described below) and/or forces external to the system acting upon the load, such as hydrodynamic forces in the case where the load comprises a fin, the load can move a distance more or less than the command distance.

To correct for occurrences where the load 12 moves a distance more or less than the command distance, the sensor 20 can again measure the current position of the load and transmit the current position to the controller 14 after the load has moved and come to a stop, as shown in block 40. As shown in block 42, the controller can then determine whether the current position of the load differs from the setpoint by more then a predetermined threshold, such as 0.002 radians, which permits a tolerable amount of error in the system 10. If the current position differs from the setpoint by more than the threshold, the controller can adjust the controller gain $K_c$, as shown in block 44. In this regard, if the current position is greater than the setpoint by more than the threshold, which indicates an overshoot by the load, the controller can adjust the controller gain by decrementing the controller gain by a predetermined amount. For example, presuming the controller gain is determined to be $K_c$=0.67225 sec, the controller can decrement the controller gain by 0.0002 sec. On the other hand, if the current position is less than the setpoint by more than the threshold, indicating the load undershot the setpoint, the controller can adjust the controller gain by incrementing the controller gain by the predetermined amount. It will be appreciated that the actuator and/or load may have a limited range of motion and, as such, the controller is capable of changing the direction of movement of the load via the actuator, such as by changing direction of movement of the actuator when the actuator comprises a motor.

After the controller 14 adjusts the controller gain, the process of moving the load 12 can repeat beginning by determining a new command distance. In this regard, if the position of the load differs from the setpoint by more than the threshold, the controller can transmit one or more subsequent control signals to the drive element 16 such that one or more input pulses are transmitted to the actuator 18 to thereby move the load to within the threshold of the setpoint. If the position of the load does not differ from the setpoint by more than the threshold, however, the controller can await receipt of another setpoint and begin the entire process again, as shown in block 46.

As indicated above, the sensor 20 measures the current position of the load 12 after the load has come to a stop to thereby allow the controller to determine whether the current position differs from the setpoint by more than the threshold. It will be appreciated, however, that in some instances the system parameters will change by an appreciable amount and/or significant external forces will act on the load during movement of the load. In such an instance, the controller 14 can quickly adjust the controller gain as the load moves toward the setpoint. For example, the controller can break up the command distance into a series of smaller sub-distances. In this regard, the sensor can be capable of measuring the position of the load for each sub-distance as the load moves to the setpoint. As such, the controller can continuously measure whether each actual distance differs from the respective sub-distance by more than the threshold and adjust the controller gain as the load moves.

It will also be appreciated that in other instances the system parameters will only change by an appreciable amount after the load 12 moves to a number of different setpoints and/or significant external forces will only intermittently act on the load. As such, referring to FIG. 4, the controller 14 can be adapted to determine whether to adjust the controller gain after the load has stopped relative to the setpoint and a subsequent setpoint has been received. As shown in blocks 48, 50 and 52, as before, the system 10 receives a setpoint, and measures the current position of the load to thereby determine the command distance. Also as before, and shown in blocks 54 and 56, from the command distance and the controller gain, the controller determines the time duration of the control signal and the input pulse is transmitted to the actuator 18 for the time duration. In contrast to the embodiment of FIG. 3, however, the controller awaits receipt of another setpoint before the controller determines whether the current position of the load differs from the previous setpoint by more than the threshold, as shown in block 58. In this regard, as shown in block 60, the sensor 20 measures the current position of the load and transmits the current position to the controller. It should be understood that although, as shown, the sensor measures the current position after the controller receives the next setpoint, the sensor can measure the current position and can transmit the current position to the controller before the controller receives the next setpoint.

After the controller 14 receives the next setpoint, the controller determines whether the current position of the load 12 differs from the previous setpoint by more than the threshold, as shown in block 62. And if the current position does differ by more than the threshold, the controller adjusts the controller gain, as described above and shown in block 64. The controller then repeats the process beginning with determining the command distance (block 52) to thereby move the load to the next setpoint.

Therefore, various embodiments of the present invention move the load in an energy balanced manner where the amount of energy transferred to the load to move the load toward the setpoint equals the amount of energy lost by the load due to a frictional torque generated by the load. As such, the load can be moved to the setpoint with one or more input pulses of short duration, as opposed to requiring a continuous input to the actuator the entire time the actuator drives the load to the setpoint. And as the load can be moved with short input pulses, the total power loss in the actuator can be reduced a significant amount as compared to traditional controllers.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of controlling an actuator connected to a load to thereby move the load toward a setpoint, said method comprising:

determining a command distance based upon the setpoint and a current position of the load;

determining a pulse duration based upon the command distance; and applying an input pulse to the actuator for the pulse duration such that the actuator generates input energy that is transferred to the load to thereby move the load toward the setpoint, wherein the input energy equals an amount of frictional energy produced by the load in moving toward the setpoint.

2. A method according to claim 1 further comprising measuring the current position of the load after applying the input pulse, wherein determining the command distance, determining the pulse duration, applying the input pulse and measuring the current position repeatedly continue until the current position differs from the setpoint by less than a predetermined threshold.

3. A method of controlling an actuator connected to a load to thereby move the load toward a setpoint, said method comprising:

determining a command distance based upon the setpoint and a current position of the load;

determining a pulse duration based upon the command distance and controller gain; and applying an input pulse to the actuator for the pulse duration such that the actuator generates input energy that is transferred to the load to thereby move the load toward the setpoint, wherein the input energy equals an amount of energy lost by the load in moving the load toward the setpoint.

4. A method according to claim 3, wherein determining a pulse duration comprises determining the pulse duration T according to the following:

$$T = K_c \times \sqrt{\theta_{cmd}},$$

and wherein $K_c$ represents the controller gain and $\theta_{cmd}$ represents the command distance.

5. A method according to claim 3, wherein determining a pulse duration further comprises determining the controller gain based upon a moment of inertia of the load, a controller torque and a frictional torque.

6. A method according to claim 5, wherein determining the controller gain comprises determining the controller gain according to the following:

$$K_c = \sqrt{\frac{2 \times I}{\tau_c \times \left(1 + \frac{\tau_c}{\tau_f}\right)}},$$

and wherein $K_c$ represents the controller gain, I represents the moment of inertia of the load, $\tau_c$ represents the controller torque and $\tau_f$ represents the frictional torque.

7. A method according to claim 3 further comprising measuring the current position of the load after applying the input pulse, wherein when the current position of the load differs from the setpoint by more than a predetermined threshold the method further comprises adjusting the controller gain based upon current position of the load.

8. A method according to claim 7, wherein adjusting the controller gain comprises decreasing the controller gain by a predetermined amount when the current position of the load is greater than the setpoint, and wherein adjusting the controller gain comprises increasing the controller gain by a predetermined amount when the current position of the load is less then the setpoint.

9. A controller for controlling an actuator connected to a load to thereby move the load toward a setpoint, said controller comprising a processing element capable of receiving a command distance based upon the setpoint and a current position of the load, wherein said processing element is also capable of determining a pulse duration based upon the command distance, wherein said processing element is additionally capable of applying an input pulse to the actuator for the pulse duration such that the actuator is capable of generating input energy that is transferred to the load to thereby move the load toward the setpoint, and wherein the input pulse is applied such that the input energy equals an amount of frictional energy produced by the load in moving toward the setpoint.

10. A controller according to claim 9, wherein said processing element is further capable of receiving the current position of the load after applying the input pulse to the actuator, and wherein said processing element is capable of repeatedly determining the command distance, determining the pulse duration, applying the input pulse and receiving the actual position until the current position differs from the setpoint by less than a predetermined threshold.

11. A controller for controlling an actuator connected to a load to thereby move the load toward a setpoint, said controller comprising a processing element capable of receiving a command distance based upon the setpoint and a current position of the load, wherein said processing element is also capable of determining a pulse duration based upon the command distance and a controller gain, wherein said processing element is additionally capable of applying an input pulse to the actuator for the pulse duration such that the actuator is capable of generating input energy that is transferred to the load to thereby move the load toward the setpoint, and wherein the input pulse is applied such that the input energy equals an amount of energy lost by the load in moving the load toward the setpoint.

12. A controller according to claim 11, wherein said processing element is capable of determining the pulse duration T according to the following:

$$T = K_c \times \sqrt{\theta_{cmd}},$$

and wherein $K_c$ represents the controller gain and $\theta_{cmd}$ represents the command distance.

13. A controller according to claim 11, wherein said processing element is also capable determining the controller gain based upon a moment of inertia of the load, a controller torque and a fictional torque.

14. A controller according to claim 13, wherein said processing element is capable of determining the controller gain according to the following:

$$K_c = \sqrt{\frac{2 \times I}{\tau_c \times \left(1 + \frac{\tau_c}{\tau_f}\right)}},$$

and wherein $K_c$ represents the controller gain, I represents the moment of inertia of the load, $\tau_c$ represents the controller torque and $\tau_f$ represents the frictional torque.

15. A controller according to claim 11, wherein said processing element is further capable of receiving the current position of the load after applying the input pulse to the actuator, and wherein when the current position differs from the setpoint by more than a predetermined threshold said processing element is further capable of adjusting the controller gain based upon the current position of the load.

16. A controller according to claim 15, wherein said processing element is capable of decreasing the controller gain by a predetermined amount when the current position of the load is greater than the setpoint, and wherein said processing element is capable of increasing the controller gain by a predetermined amount when the current position of the load is less than the setpoint.

17. A system for moving a load toward a setpoint comprising:
an actuator connected to the load, wherein said actuator is capable of generating input energy that is transferred to the load to thereby move the load toward the setpoint; and
a controller capable of controlling the operation of said actuator to move the load toward the setpoint, wherein said controller is capable of determining a command distance based upon the setpoint and a current position of the load, wherein said controller is also capable of determining a pulse duration based upon the command distance, wherein said controller is additionally capable of applying an input pulse to said actuator for the pulse duration such that said actuator generates the input energy, wherein the input pulse is applied such that the input energy equals an amount of frictional energy produced by the load in moving toward the setpoint.

18. A system according to claim 17 further comprising a sensor connected to at least one of said actuator and the load, wherein said sensor is capable of measuring the current position of the load after said controller applies the input pulse to said actuator, wherein said controller is capable of repeatedly determining the command distance, determining the pulse duration and applying the input pulse, and said sensor is capable of repeatedly measuring the actual position, until the actual position differs from the setpoint by less than a predetermined threshold.

19. A system according to claim 17 further comprising a drive element electrically connected between said controller and said actuator, wherein said drive element is capable of receiving a control signal from said controller and thereafter transmitting the input pulse to said actuator based upon the control signal.

20. A system for moving a load toward a setpoint comprising:
an actuator connected to the load, wherein said actuator is capable of generating input energy that is transferred to the load to thereby move the load toward the setpoint; and
a controller capable of controlling the operation of said actuator to move the load toward the setpoint, wherein said controller is capable of determining a command distance based upon the setpoint and a current position of the load, wherein said controller is also capable of determining a pulse duration based upon the command distance and a controller gain, wherein said controller is additionally capable of applying an input pulse to said actuator for the pulse duration such that said actuator generates the input energy, wherein the input pulse is applied such that the input energy equals an amount of energy lost by the load in moving the load toward the setpoint.

21. A system according to claim 20, wherein said controller is capable of determining the pulse duration T according to the following:

$$T = K_c \times \sqrt{\theta_{cmd}},$$

and wherein $K_c$ represents the controller gain and $\theta_{cmd}$ represents the command distance.

22. A system according to claim 20, wherein said controller is further capable of determining the controller gain based upon a moment of inertia of the load, a controller torque and a frictional torque.

23. A system according to claim 22, wherein said controller is capable of determining the controller gain according to the following:

$$K_c = \sqrt{\frac{2 \times I}{\tau_c \times \left(1 + \frac{\tau_c}{\tau_f}\right)}},$$

and wherein $K_c$ represents the controller gain, I represents the moment of inertia of the load, $\tau_c$ represents the controller torque and $\tau_f$ represents the frictional torque.

24. A system according to claim 20, further comprising a sensor connected to at least one of said actuator and the load, wherein said sensor is capable of measuring the current position of the load after said controller applies the input pulse to said actuator, wherein when the current position of the load differs from the setpoint by more than a predetermined threshold said controller is further capable of adjusting the controller gain based upon the current position of the load.

25. A system according to claim 24, wherein said controller is capable of decreasing the controller gain by a predetermined amount when the current position of the load is greater than the setpoint, and wherein said controller is capable of increasing the controller gain by a predetermined amount when the current position of the load after moving the load is less than the setpoint.

* * * * *